(12) United States Patent (10) Patent No.: US 9,000,741 B2
Huang (45) Date of Patent: Apr. 7, 2015

(54) MULTI-PHASE DC-DC CONVERTER AND CONTROLLING METHOD THEREOF

(71) Applicant: uPI Semiconductor Corp., Hsinchu County (TW)

(72) Inventor: Hua-Chiang Huang, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 109 days.

(21) Appl. No.: 13/802,790

(22) Filed: Mar. 14, 2013

(65) Prior Publication Data
US 2014/0197810 A1 Jul. 17, 2014

(30) Foreign Application Priority Data
Jan. 14, 2013 (TW) .............................. 102101352 A

(51) Int. Cl.
G05F 1/44 (2006.01)
G05F 1/46 (2006.01)

(52) U.S. Cl.
CPC ....................................... *G05F 1/468* (2013.01)

(58) Field of Classification Search
CPC ................ H02J 1/102; H02J 2001/006; H02J 2007/0059; H02J 7/0054; H02J 7/1423
USPC ................. 323/224, 225, 267–268, 271–274, 323/282–287
See application file for complete search history.

(56) References Cited

U.S. PATENT DOCUMENTS

| 5,568,044 | A | * | 10/1996 | Bittner | 323/272 |
| 7,339,361 | B2 | * | 3/2008 | Dong et al. | 323/285 |
| 7,589,511 | B2 | * | 9/2009 | Dong et al. | 323/285 |
| 8,030,905 | B2 | * | 10/2011 | Petkov | 322/46 |
| 8,058,856 | B2 | * | 11/2011 | Huang | 323/272 |
| 2010/0033154 | A1 | | 2/2010 | Cheng et al. | |

FOREIGN PATENT DOCUMENTS

| TW | 565987 | 12/2003 |
| TW | 200910040 | 3/2009 |
| TW | 200937816 | 9/2009 |

OTHER PUBLICATIONS

"Office Action of Taiwan Counterpart Application", issued on Nov. 11, 2014, pp. 1-10, in which the listed references were cited.

* cited by examiner

*Primary Examiner* — Rajnikant Patel
(74) *Attorney, Agent, or Firm* — Jianq Chyun IP Office

(57) ABSTRACT

A multi-phase DC-DC converter and a controlling method thereof are provided. The multi-phase DC-DC converter includes a plurality of output units, a sensing unit, and a pulse width modulation (PWM) controller. Each of the output units is coupled to one corresponding output inductance of a plurality of output inductances, and each of the output units and the corresponding output inductance have a phase node therebetween. The sensing unit is coupled to the phase nodes to acquire output currents of all phases and provide a plurality of difference voltages that respectively represent current differences of the phases, wherein a value of each of the difference voltages is not zero. The PWM controller adjusts a duty cycle of a PWM signal of the corresponding output unit according to each difference voltage.

16 Claims, 4 Drawing Sheets

MULTI-PHASE DC-DC CONVERTER AND CONTROLLING METHOD THEREOF

CROSS-REFERENCE TO RELATED APPLICATION

This application claims the priority benefit of Taiwan application serial no. 102101352, filed on Jan. 14, 2013. The entirety of the above-mentioned patent application is hereby incorporated by reference herein and made a part of this specification.

BACKGROUND OF THE INVENTION

1. Field of the Invention

The invention relates to a power controlling and conversion technique and particularly relates to a multi-phase direct current (DC)-DC converter and a controlling method thereof.

2. Description of Related Art

In terms of multi-phase DC-DC power conversion, the balance between output currents of all the phases has to be considered. If current balance is not taken into consideration, the output current of certain phase may be greater than the currents outputted via the channels of other phases, which may cause serious problems, such as heat and system overload. In view of the above, dozens of multi-phase power conversion devices have been provided for balancing the channel currents of different phases, so as to improve the conversion efficiency of the power converter. In other words, the design of a multi-phase DC-DC converter plays an important role for solving the problem of current balance.

SUMMARY OF THE INVENTION

Based on the above, the invention provides a multi-phase direct current (DC)-DC converter and a controlling method thereof, considering the aforementioned and other problems of the conventional technology.

The invention provides a multi-phase DC-DC converter coupled to a plurality of output inductances, and the multi-phase DC-DC converter includes a plurality of output units, a sensing unit, and a pulse width modulation (PWM) controller. Each of the output units is coupled to one corresponding output inductance of the output inductances, and each of the output units and the corresponding output inductance have a phase node therebetween. The sensing unit is coupled to the phase nodes to acquire an output current or an output voltage of each of the phases and provide a plurality of difference voltages that respectively represent current differences or voltage differences of the phases, wherein a value of each of the difference voltages is not zero. The PWM controller is coupled to the output units and the sensing unit. The number of the output inductances and the number of the output units are both N, wherein N is a natural number greater than or equal to 2. The number of the difference voltages provided by the sensing unit is N. When output voltages of the phases are respectively denoted by V1, V2 ..., and VN; the N difference voltages are respectively denoted by Vdiff1, Vdiff2 ..., and VdiffN; and an average voltage is denoted by Vave, $$Vdiff1 = A \times V1 - B \times Vave,$$

$$Vdiff2 = A \times V2 - B \times Vave,$$

$$VdiffN = A \times VN - B \times Vave,$$

wherein Vave=(accumulation of V1 to VN)/N, and A and B are coefficients respectively. The PWM controller includes an on-time calculating circuit that is coupled to the sensing unit and the output units to generate an on-time pulse to the output units according to at least one of the difference voltages.

The invention further provides a multi-phase DC-DC converter coupled to a plurality of output inductances, and the multi-phase DC-DC converter includes a plurality of output units, a sensing unit, and a pulse width modulation (PWM) controller. Each of the output units is coupled to one corresponding output inductance of the output inductances, and each of the output units and the corresponding output inductance have a phase node therebetween. The sensing unit is coupled to the phase nodes to acquire an output current of each of the phases and provide a plurality of difference voltages that respectively represent current differences of the phases. The PWM controller is coupled to the output units and the sensing unit. The number of the output inductances and the number of the output units are both N, wherein N is a natural number greater than or equal to 2. The number of the difference voltages provided by the sensing unit is N. When output currents of the phases are respectively denoted by I1, I2 ..., and IN; and the N difference voltages are respectively denoted by Vdiff1, Vdiff2 ..., and VdiffN, $$Vdiff1 = I3 - (\text{accumulation of the output currents of the phases, excluding } I1)/(N-1),$$

$$Vdiff2 = I2 - (\text{accumulation of the output currents of the phases, excluding } I2)/(N-1),$$

$$VdiffN = IN - (\text{accumulation of the output currents of the phases, excluding } IN)/(N-1),$$

wherein the PWM controller includes an on-time calculating circuit that is coupled to the sensing unit and the output units to generate an on-time pulse to the output units according to at least one of the difference voltages.

In an embodiment of the invention, the on-time calculating circuit includes a comparator. An input terminal of the comparator receives a first preset voltage associated with an input voltage and another input terminal of the comparator receives a combined signal associated with the difference voltage and a second preset voltage, so as to adjust a duty cycle of each PWM signal outputted to the corresponding output unit.

In an embodiment of the invention, the on-time calculating circuit is coupled to an identification voltage adjusting circuit generating a second preset voltage according to a voltage identification definition.

In an embodiment of the invention, the PWM controller further includes a phase channel selector coupled between the on-time calculating circuit and the output units to adjust operations of multiple phases according to a parameter, related to a load current, of the multi-phase DC-DC converter.

In an embodiment of the invention, the PWM controller further includes a phase channel selector, a plurality of comparators, a ramp generator, and an error amplifier, wherein the error amplifier and the ramp generator are coupled to input terminals of the comparators, and the phase channel selector is coupled to the ramp generator, so as to adjust the operations of multiple phases according to a parameter, related to the load current, of the multi-phase DC-DC converter.

In an embodiment of the invention, an output terminal of the error amplifier is further coupled to a compensation unit.

From another aspect, the invention provides a DC-DC controlling method, which includes the following steps. An output current of each of the phases on a plurality of output inductances is acquired. A plurality of difference voltages that respectively represent current differences of the phases are provided according to the acquired output currents of the phases, wherein a value of each of the difference voltages is not zero. A duty cycle of a PWM signal corresponding to each of the phases is adjusted according to each of the difference voltages, so as to control a channel current for power conversion of each of the phases. The number of the difference voltages provided is N and N is a natural number greater than or equal to 2. When output voltages of the phases are respectively denoted by V1, V2 . . . , and VN; the N difference voltages are respectively denoted by Vdiff1, Vdiff2 . . . , and VdiffN; and an average voltage is denoted by Vave, Vdiff1=A×V1−B×Vave, Vdiff2=A×V2−B×Vave, and VdiffN=A×VN−B×Vave, wherein Vave=(accumulation of V1 to VN)/N, and A and B are coefficients respectively.

The invention further provides a DC-DC controlling method, which includes the following steps. An output current of each of the phases on a plurality of output inductances is acquired. A plurality of difference voltages that respectively represent current differences of the phases are provided according to the acquired output currents of the phases, wherein a value of each of the difference voltages is not zero. A duty cycle of a PWM signal corresponding to each of the phases is adjusted according to each of the difference voltages, so as to control a channel current for power conversion of each of the phases. The number of the difference voltages provided is N and N is a natural number greater than or equal to 2. When output currents of the phases are respectively denoted by I1, I2 . . . , and IN; and the N difference voltages are respectively denoted by Vdiff1, Vdiff2 . . . , and VdiffN, Vdiff1=I1−(accumulation of the output currents of the phases, excluding I1)/(N−1), Vdiff2=I2−(accumulation of the output currents of the phases, excluding I2)/(N−1), and VdiffN=IN−(accumulation of the output currents of the phases, excluding IN)/(N−1).

In an embodiment of the invention, when performing the step of adjusting the duty cycle of the PWM signal corresponding to each of the phases, an adjustment step for the PWM signal of each of the phases includes: receiving a first preset voltage associated with an input voltage and receiving a combined signal of the difference voltage associated with the phase and a second preset voltage; and performing comparison on the first preset voltage and the combined signal and using a generated comparison error signal to adjust the duty cycle of the PWM signal of the phase.

Based on the above, the invention calculates and acquires the difference voltages that respectively represent the phases, and none of the values of the difference voltages is zero. Moreover, the duty cycle of the PWM signal of the corresponding output unit is adjusted according to each of the difference voltages, which causes the output current of each phase channel to vary accordingly. Thus, the multi-phase DC-DC converter of the invention is capable of maintaining the balance between the channel currents of all the phases and improving the conversion efficiency.

In order to make the aforementioned and other features and advantages of the invention more comprehensible, several embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
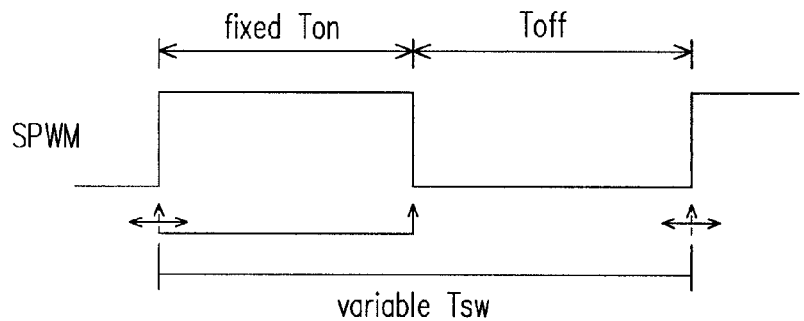
FIG. 1 is a diagram illustrating a pulse width modulation control of a variable switching frequency.

Reference will now be made in detail to the embodiments of the invention, examples of which are illustrated in the accompanying figures. In addition, identical or similar reference numerals stand for identical or similar elements/components in the figures and the embodiments.

FIG. 1 is a diagram illustrating a pulse width modulation control of a variable switching frequency. Please refer to FIG. 1. First, a fixed on-time controlling mechanism is described. In multi-phase DC-DC conversion, a channel current of each phase may be driven by a pulse width modulation (PWM) signal SPWM. The PWM signal SPWM has a fixed on-time Ton and a fixed off-time Toff. And, a switching cycle Tsw of the PWM signal SPWM may be varied. Therefore, a duty cycle of the PWM signal SPWM may be adjusted to vary an output current of the corresponding channel.

Figure 2:
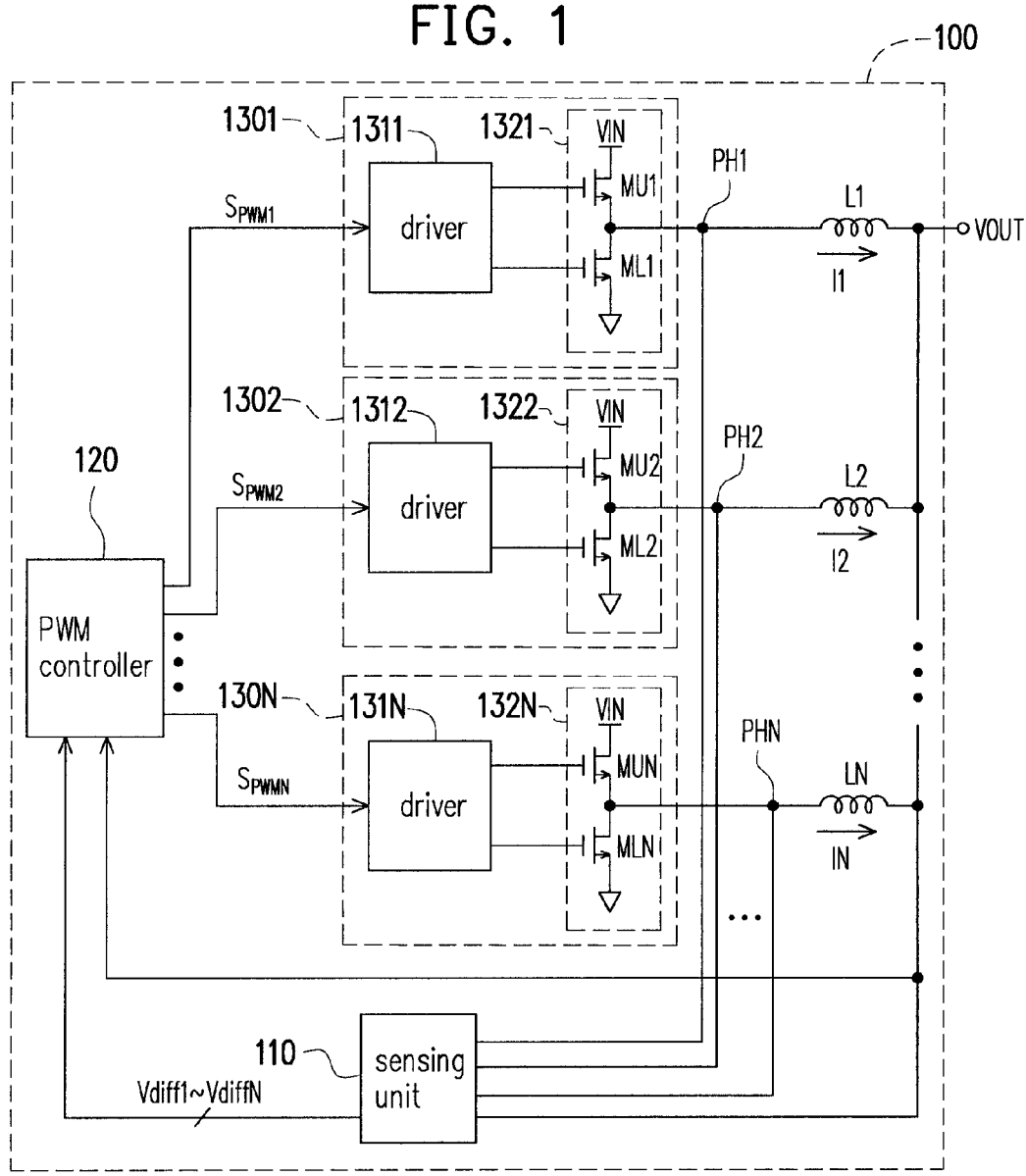
FIG. 2 is a diagram illustrating a multi-phase DC-DC converter according to an embodiment of the invention.

FIG. 2 is a diagram illustrating a multi-phase DC-DC converter according to an embodiment of the invention. Please refer to FIG. 2. The multi-phase DC-DC converter 100 includes output units 1301, 1302, and 130N, a sensing unit 110, and a pulse width modulation (PWM) controller 120, based on the fixed on-time controlling mechanism. More specifically, the output unit 1301 includes a driver 1311 and an output stage 1321, wherein the output stage 1321 includes a power switch MU1 and a power switch ML1. The output unit 1302 includes a driver 1312 and an output stage 1322, wherein the output stage 1322 includes a power switch MU2 and a power switch ML2. Accordingly, the output unit 130N includes a driver 131N and an output stage 132N, wherein the output stage 132N includes a power switch MUN and a power switch MLN.

Each of the output units 1301-130N is coupled to one corresponding output inductance of a plurality of output inductances L1-LN, and each of the output units 1301-130N and the corresponding output inductance L1-LN have a phase node therebetween. A terminal of each of the output inductances L1-LN is connected to one another at a juncture that is used for providing an output voltage VOUT to a load. To be more specific, the output unit 1301 is coupled to the output inductance L1 and has a phase node PH1; the output unit 1302 is coupled to the output inductance L2 and has a phase node PH2; and accordingly, the output unit 130N is coupled to the output inductance LN and has a phase node PHN.

The sensing unit 110 is coupled to the phase nodes PH1-PHN to acquire output currents of all phases. The sensing unit 110 is configured for providing a plurality of difference voltages Vdiff1-VdiffN that respectively represent current differences or voltage differences of all phases. It should be noted that none of the values of the difference voltages Vdiff1-VdiffN is zero.

Specifically, the number of the difference voltages Vdiff1-VdiffN provided by the sensing unit 110 is N, wherein N is a natural number greater than or equal to 2. When the output voltages of all the phases are respectively denoted by V1, V2 . . . , and VN; N difference voltages are respectively denoted by Vdiff1, Vdiff2 ..., and VdiffN; and an average voltage is denoted by Vave, the related calculation may be shown as follows:

$$Vdiff1 = A \times V1 - B \times Vave$$

$$Vdiff2 = A \times V2 - B \times Vave$$

$$VdiffN = A \times VN - B \times Vave$$

Herein, Vave=(V1+V2+ ... +VN)/N, and A and B are coefficients, respectively.

Figure 3:
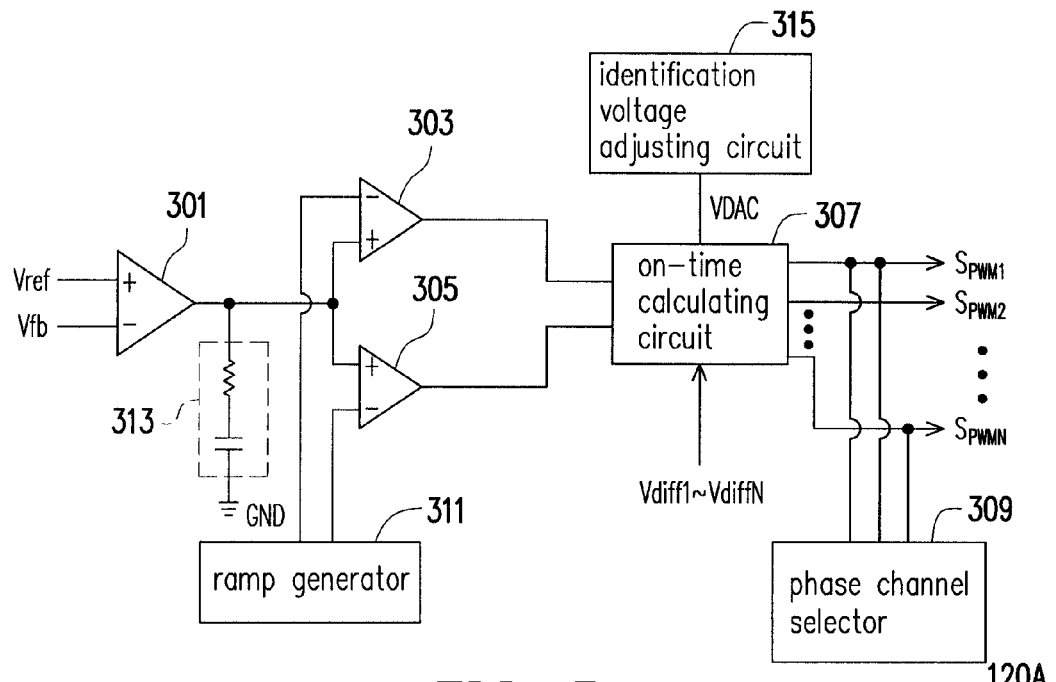
FIG. 3 is a diagram illustrating a pulse width modulation controller according to an embodiment of the invention.

FIG. 3 is a diagram illustrating a pulse width modulation controller according to an embodiment of the invention. Please refer to FIG. 3. A PWM controller 120A includes an error amplifier 301, comparators 303 and 305, an on-time calculating circuit 307, a phase channel selector 309, a ramp generator 311, and an identification voltage adjusting circuit 315. A non-invert-phase input terminal of the error amplifier 301 is coupled to a reference voltage Vref, and an invert-phase input terminal thereof is coupled to a feedback voltage Vfb related to the output voltage VOUT. Non-invert-phase input terminals of the comparators 303 and 305 are coupled to an output of the error amplifier 301. Invert-phase input terminals of the comparators 303 and 305 are coupled to the ramp generator 311.

The identification voltage adjusting circuit 315 provides a preset voltage VDAC to the on-time calculating circuit 307 according to a voltage identification definition (VID). The preset voltage VDAC is a reference voltage. In addition, the preset voltage VDAC may be varied according to the voltage identification definition (VID). The voltage identification definition may be a pulse width modulation voltage identification definition (PWMVID) or the like.

The on-time calculating circuit 307 may be coupled to the sensing unit 110 and the output units 1301-130N, as shown in FIG. 2, so as to generate an on-time pulse to the output units 1301-130N through at least one of the difference voltages Vdiff1-VdiffN.

Figure 5:
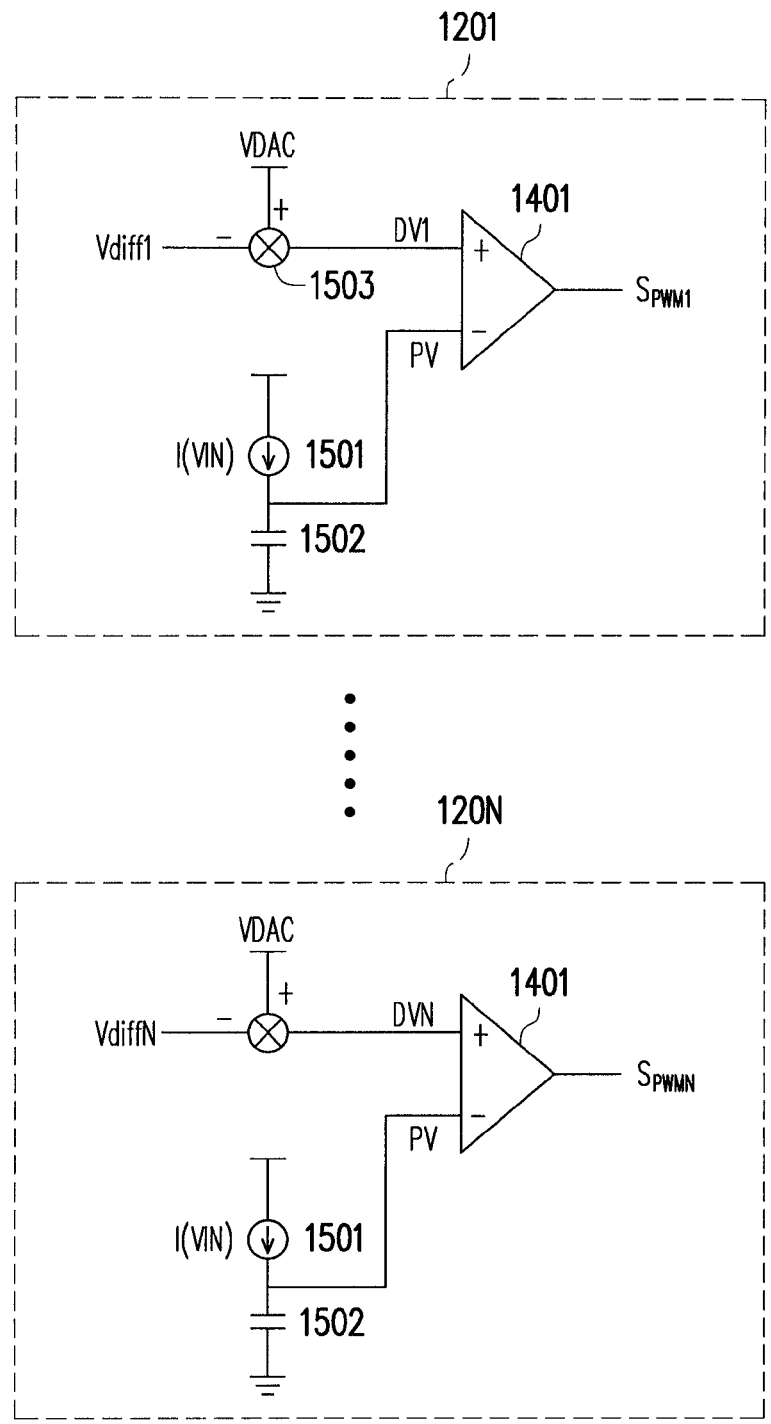
FIG. 5 is a diagram illustrating an on-time calculating circuit according to an embodiment of the invention.

The on-time calculating circuit 307 is further explained in detail with reference to FIG. 5. FIG. 5 is a diagram illustrating the on-time calculating circuit 307 according to an embodiment of the invention. The on-time calculating circuit 307 includes on-time calculating units 1201 ..., and 120N. The on-time calculating unit 1201 includes a comparator 1401. A first input terminal of the comparator 1401 receives a preset voltage PV associated with an input voltage VIN, wherein a current source 1501 charges a capacitance 1502 and generates the preset voltage PV. A second input terminal of the comparator 1401 receives a combined signal DV1 associated with the difference voltage Vdiff1 and the preset voltage VDAC, wherein an operation may be performed on the difference voltage Vdiff1 and the preset voltage VDAC via an adder-subtracter, i.e. DV1=VDAC−Vdiff1. Accordingly, the on-time calculating unit 1201 may adjust a duty cycle of a PWM signal $S_{PWM1}$ outputted to the corresponding output unit 1301 through a preset voltage PV1 and the combined signal DV1.

It should be noted that the operation on the difference voltage (Vdiff1-VdiffN) of FIG. 5 may be performed with the preset voltage VDAC, and furthermore the difference voltage (Vdiff1-VdiffN) may affect a charge current of the on-time calculating unit 1201.

Moreover, on-time calculating units 1401-140N have the same structures. Similar to a working principle of the on-time calculating unit 1401, in the on-time calculating unit 140N, a positive input terminal of the comparator 140N receives a combined signal DVN associated with the difference voltage VdiffN and the preset voltage VDAC, i.e. DVN=VDAC−VdiffN. The on-time calculating unit 140N adjusts a duty cycle of a PWM signal $S_{PWMN}$ outputted to the corresponding output unit 130N through the preset voltage PV and the combined signal DVN.

Please refer to FIG. 2 and FIG. 3. The phase channel selector 309 is coupled between the on-time calculating circuit 307 and the output units 1301-130N, so as to adjust the operations of multiple phases according to a parameter, related to a load current, of the multi-phase DC-DC converter 100. For example, the phase channel selector 309 turns on two of the phases and turns off N−2 phases; however, the invention is not limited thereto. In addition, the parameter may include all the load currents, a current (e.g. I1, I2, or IN) in proportion to the load currents, or a voltage related to the load currents.

A compensation unit 313 may be coupled between an output terminal and a ground terminal GND of the error amplifier 301. The compensation unit 313 includes a resistance and a capacitance that are connected in series for compensating for an output signal of the error amplifier 301.

Figure 4:
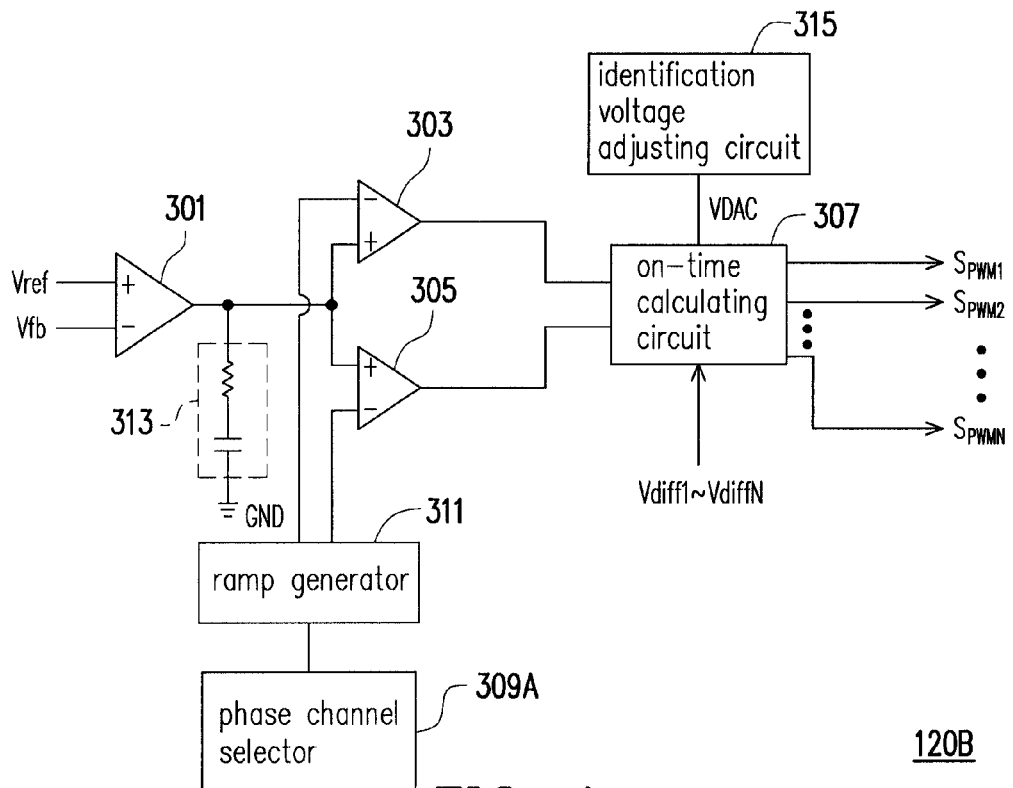
FIG. 4 is a diagram illustrating a pulse width modulation controller according to another embodiment of the invention.

FIG. 4 is a diagram illustrating a pulse width modulation controller according to another embodiment of the invention. Please refer to FIG. 4. A PWM controller 120B of FIG. 4 is similar to the PWM controller 120A of FIG. 3, and a difference therebetween lies in that: a phase channel selector 309A of the PWM controller 120B is coupled to the ramp generator 311. The phase channel selector 309A may adjust the operations of multiple phases according to a parameter, related to a load current, of the multi-phase DC-DC converter 100. For example, the phase channel selector 309A turns on two of the phases and turns off N−2 phases; however, the invention is not limited thereto. In addition, the parameter may include all the load currents, a current (e.g. I1, I2, or IN) in proportion to the load currents, or a voltage related to the load currents.

In yet another variant embodiment, a calculation of the sensing unit 110 of FIG. 2 may be shown as follows. When the output currents of all the phases are respectively denoted by I1, I2 ..., and IN; and N difference voltages are respectively denoted by Vdiff1, Vdiff2 ..., and VdiffN:

$$Vdiff1 = I1 - (I2+I3+ \ldots +IN)/(N-1) = I1 - (\text{accumulation of the output currents of all the phases, excluding } I1)/(N-1);$$

$$Vdiff2 = I1 - (I1+I3+ \ldots +IN)/(N-1) = I2 - (\text{accumulation of the output currents of all the phases, excluding } I2)/(N-1); \text{ and}$$

$$VdiffN = I1 - (I2+I3+ \ldots +IN-1)/(N-1) = IN - (\text{accumulation of the output currents of all the phases, excluding } IN)/(N-1).$$

In comparison with a calculation method that averages the output currents of all the phases, the aforementioned calculation method excludes the current of one specific phase and accumulates the rest of the output currents to calculate an average. Since one variable is excluded, the aforementioned calculation method has faster calculation speed and reflects the load variation faster.

After calculating the difference voltages Vdiff1-VdiffN, the PWM controller 120 may adjust the duty cycle of the PWM signal $S_{PWM1}$ of the corresponding output unit 1301 according to the difference voltage Vdiff1. The PWM controller 120 may adjust the duty cycle of the PWM signal $S_{PWM2}$ of the corresponding output unit 1302 according to the difference voltage Vdiff2. The PWM controller 120 may adjust the duty cycle of the PWM signal $Sp_{PWMN}$ of the corresponding output unit 130N according to the difference voltage VdiffN. Accordingly, the PWM controller 120 adjusts the duty cycles of the PWM signals $S_{PWM1}$, $S_{PWM2}$ ..., and $S_{PWMN}$ to cause the output currents I1, I2 ..., and IN of the corresponding channels to vary.

Based on the above, in the embodiments of the invention, the difference voltages are calculated to respectively represent the phases, and none of the values of the difference voltages is zero. Moreover, the duty cycle of the PWM signal of the corresponding output unit is adjusted according to each of the difference voltages, thereby causing the output current of each channel to vary accordingly. Thus, the multi-phase DC-DC converter maintains the balance between the channel currents of all the phases, and thereby enhances the power conversion efficiency.

Figure 6:
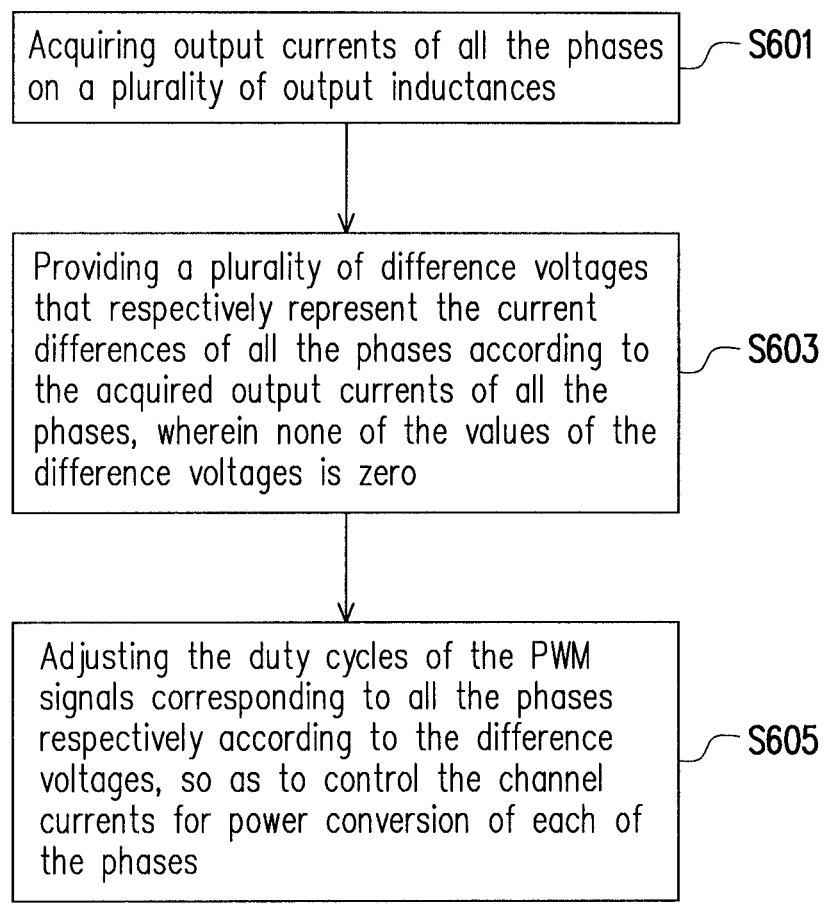
FIG. 6 is a flowchart illustrating a DC-DC controlling method according to an embodiment of the invention.

Based on the descriptions of the above embodiments, a DC-DC controlling method is provided in the following paragraphs. More specifically, FIG. 6 is a flowchart illustrating a DC-DC controlling method according to an embodiment of the invention. To easily understand the disclosure, please refer to FIG. 2 and FIG. 6 at the same time. The DC-DC controlling method according to this embodiment may include the following steps.

As shown in Step S601, output currents of all the phases on a plurality of output inductances L1-LN are acquired.

Then, as shown in Step S603, a plurality of difference voltages Vdiff1-VdiffN that respectively represent the current differences of the phases are provided according to the acquired output currents of all the phases, wherein none of the values of the difference voltages Vdiff1-VdiffN is zero.

Next, as shown in Step S605, the duty cycles of the PWM signals $S_{PWM1}$-$S_{PWN}$ corresponding to all the phases are respectively adjusted according to the difference voltages Vdiff1-VdiffN, so as to control the channel currents I1-IN for power conversion of each of the phases.

Calculation of the difference voltages Vdiff1-VdiffN is implemented as specified below.

When N difference voltages are provided; N is greater than or equal to a natural number of 2; the output voltages of all the phases are respectively denoted by V1, V2 ..., and VN; N difference voltages are respectively denoted by Vdiff1, Vdiff2 ..., and VdiffN; and an average voltage is denoted by Vave:

$$Vdiff1 = A \times V1 - B \times Vave,$$

$$Vdiff2 = A \times V2 - B \times Vave,$$

$$VdiffN = A \times VN - B \times Vave,$$

Herein, Vave=(V1+V2+ ... +VN)/N, and A and B are coefficients, respectively.

In yet another variant embodiment, when N difference voltages are provided; N is greater than or equal to a natural number of 2; the output currents of all the phases are respectively denoted by I1, I2 ..., and IN; and N difference voltages are respectively denoted by Vdiff1, Vdiff2 ..., and VdiffN:

$$Vdiff1 = I1 - (\text{accumulation of the output currents of all the phases,excluding } I1)/(N-1),$$

$$Vdiff2 = I2 - (\text{accumulation of the output currents of all the phases,excluding } I2)/(N-1), \text{ and}$$

$$VdiffN = IN - (\text{accumulation of the output currents of all the phases,excluding } IN)/(N-1).$$

Please refer to FIG. 5. When performing the step of adjusting the duty cycle of the PWM signal corresponding to each of the phases, an adjustment step for the PWM signal of each phase includes: receiving the preset voltage PV associated with the input voltage VIN and receiving the combined signal (one of DV1-DVN) of the difference voltage (one of Vdiff1-VdiffN) associated with the phase and the preset voltage VDAC; and performing comparison on the preset voltage PV and the combined signal (one of DV1-DVN), and using a generated comparison error signal to adjust the duty cycle of the PWM signal (one of Vdiff1-VdiffN) of the phase.

In conclusion of the above, the invention utilizes the fixed on-time controlling mechanism, and none of the obtained difference voltages is zero. Each of the difference voltages may be used to adjust the duty cycle of the PWM signal corresponding to each of the phases, and the PWM signal of each of the phases causes the output current of the corresponding channel to vary. Thus, the multi-phase DC-DC converter of the invention is capable of maintaining the balance between the channel currents of all the phases and improving the conversion efficiency.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A multi-phase direct current (DC)-DC converter, coupled to a plurality of output inductances, the multi-phase DC-DC converter comprising:
    a plurality of output units each coupled to one corresponding output inductance of the output inductances, and each of the output units and the corresponding output inductance comprising a phase node therebetween;
    a sensing unit coupled to the phase nodes and acquiring an output current of each of phases and providing a plurality of difference voltages that respectively represent current differences of the phases, wherein a value of each of the difference voltages is not zero; and
    a pulse width modulation (PWM) controller coupled to the output units and the sensing unit,
    wherein the number of the output inductances and the number of the output units are both N, and N is a natural number greater than or equal to 2,
    wherein the number of the difference voltages provided by the sensing unit is N, and when output voltages of the phases are respectively denoted by V1, V2 ..., and VN; the N difference voltages are respectively denoted by Vdiff1, Vdiff2 ..., and VdiffN; and an average voltage is denoted by Vave, $$Vdiff1 = A \times V1 - B \times Vave,$$

$$Vdiff2 = A \times V2 - B \times Vave, \text{ and}$$

$$VdiffN = A \times VN - B \times Vave,$$

wherein Vave (accumulation of V1 to VN)/N, and A and B are coefficients respectively, and
    wherein the PWM controller comprises an on-time calculating circuit coupled to the sensing unit and the output units to generate an on-time pulse to the output units according to at least one of the difference voltages.

2. The multi-phase DC-DC converter according to claim 1, wherein the on-time calculating circuit comprises a comparator, and an input terminal of the comparator receives a first preset voltage associated with an input voltage and another input terminal of the comparator receives a combined signal associated with the difference voltage and a second preset voltage.

3. The multi-phase DC-DC converter according to claim 1, wherein the on-time calculating circuit is coupled to an identification voltage adjusting circuit generating a second preset voltage according to a voltage identification definition.

4. The multi-phase DC-DC converter according to claim 1, wherein the PWM controller further comprises a phase channel selector coupled between the on-time calculating circuit and the output units to adjust operations of multiple phases according to a parameter, related to a load current, of the multi-phase DC-DC converter.

5. The multi-phase DC-DC converter according to claim 1, wherein the PWM controller further comprises a phase channel selector, a plurality of comparators, a ramp generator, and an error amplifier, wherein the error amplifier and the ramp generator are coupled to input terminals of the comparators, and the phase channel selector is coupled to the ramp generator to adjust the operations of multiple phases according to a parameter, related to the load current, of the multi-phase DC-DC converter.

6. The multi-phase DC-DC converter according to claim 5, wherein an output terminal of the error amplifier is coupled to a compensation unit.

7. A multi-phase DC-DC converter, coupled to a plurality of output inductances, the multi-phase DC-DC converter comprising:
a plurality of output units each coupled to one corresponding output inductance of the output inductances, and each of the output units and the corresponding output inductance comprising a phase node therebetween;
a sensing unit coupled to the phase nodes and acquiring an output current of each of phases and providing a plurality of difference voltages that respectively represent current differences of the phases, wherein a value of each of the difference voltages is not zero; and
a pulse width modulation (PWM) controller coupled to the output units and the sensing unit,
wherein the number of the output inductances and the number of the output units are both N, and N is a natural number greater than or equal to 2,
wherein the number of the difference voltages provided by the sensing unit is N, and when output currents of the phases are respectively denoted by I1, I2 . . . , and IN; and the N difference voltages are respectively denoted by Vdiff1, Vdiff2 . . . , and VdiffN, $V\text{diff1}=I1-(\text{accumulation of the output currents of the phases,excluding }I1)/(N-1),$ $V\text{diff2}=I2-(\text{accumulation of the output currents of the phases,excluding }I2)/(N-1),$ and $V\text{diffN}=IN-(\text{accumulation of the output currents of the phases,excluding }IN)/(N-1),$ wherein the PWM controller comprises an on-time calculating circuit coupled to the sensing unit and the output units to generate an on-time pulse to the output units according to at least one of the difference voltages.

8. The multi-phase DC-DC converter according to claim 7, wherein the on-time calculating circuit comprises a comparator, and an input terminal of the comparator receives a first preset voltage associated with an input voltage and another input terminal of the comparator receives a combined signal associated with the difference voltage and a second preset voltage.

9. The multi-phase DC-DC converter according to claim 7, wherein the on-time calculating circuit is coupled to an identification voltage adjusting circuit generating a second preset voltage according to a voltage identification definition.

10. The multi-phase DC-DC converter according to claim 7, wherein the PWM controller comprises a phase channel selector coupled between the on-time calculating circuit and the output units to adjust operations of multiple phases according to a parameter, related to a load current, of the multi-phase DC-DC converter.

11. The multi-phase DC-DC converter according to claim 7, wherein the PWM controller comprises a phase channel selector, a plurality of comparators, a ramp generator, and an error amplifier, wherein the error amplifier and the ramp generator are coupled to input terminals of the comparators, and the phase channel selector is coupled to the ramp generator to adjust the operations of multiple phases according to a parameter, related to the load current, of the multi-phase DC-DC converter.

12. The multi-phase DC-DC converter according to claim 7, wherein an output terminal of the error amplifier is coupled to a compensation unit.

13. A multi-phase DC-DC controlling method, comprising:
acquiring an output current of each of phases on a plurality of output inductances;
providing a plurality of difference voltages that respectively represent current differences of the phases according to the acquired output currents of the phases, wherein a value of each of the difference voltages is not zero; and
adjusting a duty cycle of a PWM signal corresponding to each of the phases according to each of the difference voltages to control a channel current for power conversion of each of the phases,
wherein the number of the difference voltages provided is N and N is a natural number greater than or equal to 2, and when output voltages of the phases are respectively denoted by V1, V2 . . . , and VN; the N difference voltages are respectively denoted by Vdiff1, Vdiff2 . . . , and VdiffN; and an average voltage is denoted by Vave, $V\text{diff1}=A\times V1-B\times V\text{ave},$ $V\text{diff2}=A\times V2-B\times V\text{ave},$ and $V\text{diffN}=A\times VN-B\times V\text{ave},$ wherein Vave=(accumulation of V1 to VN)/N, and A and B are coefficients respectively.

14. The multi-phase DC-DC controlling method according to claim 13, wherein when performing the step of adjusting the duty cycle of the PWM signal corresponding to each of the phases, an adjustment step for the PWM signal of each of the phases comprises:
receiving a first preset voltage associated with an input voltage and receiving a combined signal of the difference voltage associated with the phase and a second preset voltage; and
performing comparison on the first preset voltage and the combined signal and using a generated comparison error signal to adjust the duty cycle of the PWM signal of the phase.

15. A multi-phase DC-DC controlling method, comprising:
acquiring an output current of each of phases on a plurality of output inductances;
providing a plurality of difference voltages that respectively represent current differences of the phases according to the acquired output currents of the phases, wherein a value of each of the difference voltages is not zero; and adjusting a duty cycle of a PWM signal corresponding to each of the phases according to each of the difference voltages to control a channel current for power conversion of each of the phases, wherein the number of the difference voltages provided is N and N is a natural number greater than or equal to 2, and when output currents of the phases are respectively denoted by I1, I2 . . . , and IN; and the N difference voltages are respectively denoted by Vdiff1, Vdiff2 . . . , and VdiffN, $V\text{diff}1 = I1 - (\text{accumulation of the output currents of the phases, excluding } I1)/(N-1)$, $V\text{diff}2 = I2 - (\text{accumulation of the output currents of the phases, excluding } I2)/(N-1)$, and $V\text{diff}N = IN - (\text{accumulation of the output currents of the phases, excluding } IN)/(N-1)$.

16. The multi-phase DC-DC controlling method according to claim 15, wherein when performing the step of adjusting the duty cycle of the PWM signal corresponding to each of the phases, an adjustment step for the PWM signal of each of the phases comprises:

receiving a first preset voltage associated with an input voltage and receiving a combined signal of the difference voltage associated with the phase and a second preset voltage; and performing comparison on the first preset voltage and the combined signal and using a generated comparison error signal to adjust the duty cycle of the PWM signal of the phase.

* * * * *